United States Patent [19]

Sahara et al.

[11] 4,392,727
[45] Jul. 12, 1983

[54] CAMERA EXPOSURE CONTROL DEVICES WITH SMOOTHING CIRCUIT

[75] Inventors: Masayoshi Sahara, Sennan; Masaaki Nakai, Nara; Tokuji Ishida, Daito; Hiroshi Hosomizu, Sakai, all of Japan

[73] Assignee: Minolta Camera Kabushiki Kaisha, Osaka, Japan

[21] Appl. No.: 301,096

[22] Filed: Sep. 10, 1981

[30] Foreign Application Priority Data

Sep. 20, 1980 [JP] Japan ................................ 55-131099

[51] Int. Cl.³ ........................ G03B 7/085; G03B 7/089
[52] U.S. Cl. ..................................................... 354/43
[58] Field of Search ...................... 354/29, 30, 36, 38, 354/42–44, 50, 51, 60 R, 60 A, 32–35, 139, 149, 145; 352/141; 250/214 P

[56] References Cited

U.S. PATENT DOCUMENTS

| 3,520,597 | 7/1970 | Fujii | 354/43 X |
| 4,275,335 | 6/1981 | Ishida | 315/241 P |
| 4,288,150 | 9/1981 | Ishida | 352/141 X |
| 4,305,647 | 12/1981 | Ishida | 354/33 |

Primary Examiner—William B. Perkey
Attorney, Agent, or Firm—Watson, Cole, Grindle & Watson

[57] ABSTRACT

A controlling device that determines the diaphragm aperture of the camera in accordance with an output of a light measuring circuit, which detects a light from an object to be photographed being illuminated by a light which includes an alternatingly changing component and has its intensity maintained constant in effect for a given time period. The device is equipped with a smoothing circuit for smoothing the ripple component in the photoelectric output. The smoothing circuit is set to have a charge time constant smaller than the discharge time constant and generates an output equivalent to the peak value of the ripple component. The light that illuminates the photographic object can be generated from the electronic flash and the photoelectric detector may be arranged within the body of a camera to receive the light from the photographic object that passes through the diaphragm aperture of the camera.

5 Claims, 3 Drawing Figures

CAMERA EXPOSURE CONTROL DEVICES WITH SMOOTHING CIRCUIT

BACKGROUND OF THE INVENTION

1. Field of the Invention

The present invention relates to exposure control devices for photographic cameras and in particular to such devices wherein the output signal of a light measuring circuit is smoothed and used for exposure control while the light measuring circuit is measuring an object or scene light with its intensity including a component that changes with high frequency.

2. Prior Art

A diaphragm control device has been proposed wherein an electronic flash tube is actuated prior to a film exposure to illuminate an object to be photographed with a light of a constant intensity. The light from the object is measured by a light measuring circuit through the fully open diaphragm, known photographic calculation is made with the output signal from the light measuring circuit and a signal as a function of the F number of the photographic lens. The result of the calculation is stored in a storage circuit, the diaphragm is stopped down with the object light being measured through the diaphragm aperture (the pre-exposure illumination by the electronic flash tube being continued also in this time), and the output of the light measuring circuit is compared with the value stored in the aforementioned storage circuit to stop the operation of the diaphragm and determine the aperture size when both values being compared attain a proportionate relationship.

In a device such as the above, the pre-exposure flash light of a constant intensity is obtained by intermittently providing high periodic current to the flash discharge tube. Therefore, it actually embodies a high frequency component in the illuminated light even though in effect it has a constant intensity. It is therefore possible that a highly responsive photoelectric element is liable to respond to the change of the light intensity, resulting in a control error. The present invention provides a smoothing circuit between the light measuring circuit and the exposure control circuit for the purpose of eliminating such defects.

A known circuit structure includes a ripple-smoothing resistance between the output of an photoelectric circuit and a control circuit so that, when an object brightness is measured with the object being illuminated by a light source energized by an AC commercial power source, the output will correspond to an average value of the AC component of the brightness.

When the absolute value of an object brightness is necessary such as in the case of shutter speed control according to an measurement of an object's brightness, the average value of the AC component in the brightness must be detected. However, in the automatic diaphragm determination for flash photography mentioned above, the absolute value of the light intensity should not necessarily be determined so long as the object is illuminated with constant light from the time when the diaphragm is fully opened until the stopping-down operation of the diaphragm is stopped. Additionally as the pre-exposure flash light emission must be maintained for a given period with the flash tube being energized by a capacitor which is charged by a voltage boosted from an output of a battery of a small capacity, the intensity of the flash light can not be high. Therefore, the circuit for diaphragm control should preferably utilize the light reflected from the object most effectively.

SUMMARY OF THE INVENTION

A primary object of the present invention is to provide a device which controls the exposure mechanism of a camera in accordance with the measurement of an object's light without being influenced by the high frequency component thereof.

Furthermore, another object of the invention is to provide an exposure control device such as the one mentioned above that will most effectively utilize the light with limited intensity.

Yet another object of the invention is to provide an improved circuit for controlling the photographic lens or diaphragm aperture of a camera according to the light from an object illuminated by the light from an electronic flash, the intensity of which changes at a high frequency.

A further object of the invention is to provide an exposure control circuit including a smoothing circuit for smoothing the AC component in the output of the light measuring circuit and which generates a smoothed output with its level corresponding to the maximum value in the output of the light measuring circuit.

And still another object of this invention is to provide a smoothing circuit that smooths AC electronic signals to produce an output equivalent to the peak value of the signals.

According to the present invention, a smoothing circuit connected to the output of a photoelectric circuit, has a time constant for charging that is smaller than the time constant for discharging whereby the light measurement signal for exposure control will correspond to the peak value of the AC wave form characteristics of an object light.

According to the present invention, in determining the diaphragm aperture of the camera utilizing the reflection of an auxiliary light from an object, with the light including AC component, an approximately peak value of the AC component in the output signal of a light measuring circuit can be used as the light measurement. Therefore, the invention has an advantage in the S/N ratio compared to a circuit using a smoothing circuit that generates an output equivalent to the average value of the AC component as was known in prior art devices. It is also possible to reduce the electric energy consumption of the flash that produces the auxiliary light by relatively reducing the light intensity to be emitted from the flash tube.

It is to be understood that although the present invention was made in connection with a device that determines a camera diaphragm aperture using auxiliary light emitted from an electronic flash device, the application of the invention is not limited to such device but may be extended to any devices so long as the devices need a relative value of a light measurement rather than its absolute value with the light to be measured including an AC component.

BRIEF DESCRIPTION OF THE DRAWINGS

The above objects, features and advantages will become clear from the following explanation of preferred embodiments of the present invention with reference to the attached drawing, wherein.

DETAILED DESCRIPTION OF PREFERRED EMBODIMENTS

Figure 1:
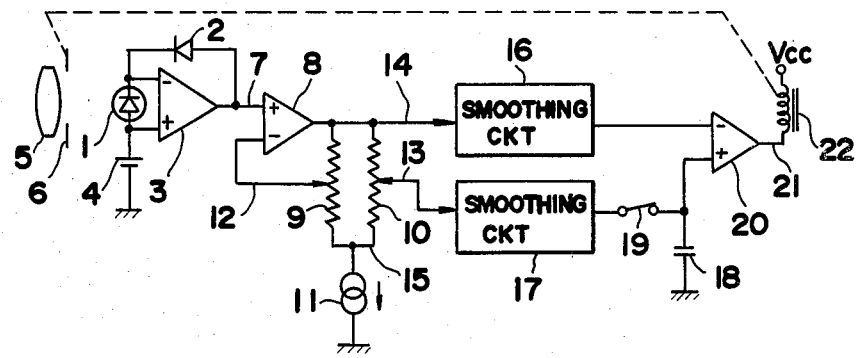
FIG. 1 is a schematic diagram of an exposure control circuit of a camera using the invention.

In the circuit of FIG. 1, photo diode 1, logarithmic compression diode 2, operational amplifier 3 and constant voltage biasing source 4 form a known light measuring circuit generating from output terminal 7 voltage signals proportional to the logarithm of the intensity of the object light passing through the photographic lens and the diaphragm aperture. Diaphragm 6 is stopped down from being full open towards the minimum aperture in conjunction with shutter release operation until electromagnet 22 arrests a diaphragm drive member to determine the aperture. Operational amplifier 8, potentiometers 9 and 10, and constant current source 11 constitute a level shift circuit. Wiper 12 of potentiometer 9 is set to a position corresponding to the sensitivity of the film used, and wiper 13 of potentiometer 10 is set to a position shifted from terminal 14 towards terminal 15 by an amount corresponding to the steps between the full open diaphragm aperture i.e. the minimum f-number value and a diaphragm or f-number value pre-selected for flash photography. For example, when the diaphragm aperture is to be controlled at F 5.6 for flash photography, the wiper is shifted from terminal 14 by an amount corresponding to four steps for the photographic lens of F 1.4 whereas the wiper is shifted by an amount corresponding to two steps for the photographic lens of F 2.8.

Switch 19 between the output of smoothing circuit 17 and capacitor 18 is opened immediately prior to the stopping-down of diaphragm 6 in conjunction with shutter release operation, and the voltage signal corresponding to the output at wiper 13 when the diaphragm is fully open, is stored by capacitor 18. When the voltage level of the inversion input of comparison circuit 20 connected to the output of smoothing circuit 16 is higher than the non-inversion input of the same connected to capacitor 18, comparison circuit 20 generates a "low" voltage signal from output 21 to energize electromagnet 22, and provides a "high" voltage from output 21 to deenergize electromagnet 22 and stops the stopping down operation of diaphragm 6 when the voltage level of the inversion input is lower.

Figure 2:
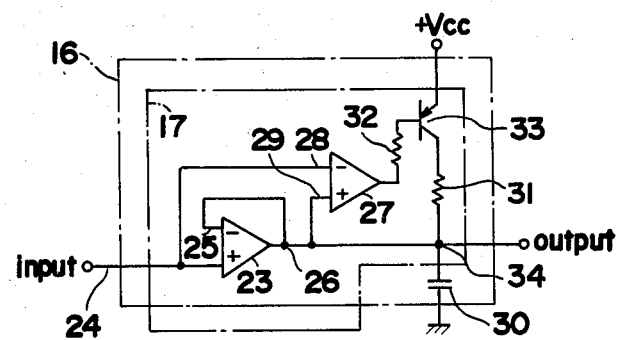
FIG. 2 is a circuit diagram illustrating an embodiment of smoothing circuits 16 and 17 of the circuit in FIG. 1.

In FIG. 2, which shows an embodiment of the smoothing circuit shown by blocks 16 and 17 in FIG. 1, input terminal 24 is connected to terminal 13 or 14 of the circuit in FIG. 1. Input terminal 24 is directly connected to the inversion input 28 of voltage comparison circuit 27 and is also connected to the non-inversion input 29 through buffer circuit 23. Also, non-inversion input 29 is connected to the node between smoothing capacitor 30 and resistor 31. The output of voltage comparison circuit 27 is connected to the base of PNP transistor 33 through resistor 32, and the collector of that transistor is connected to capacitor 30 through resistor 31.

Figure 3:
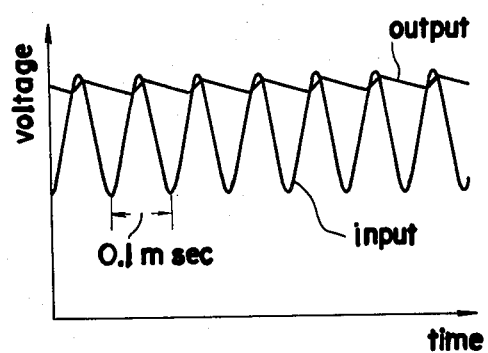
FIG. 3 is a voltage-time graph illustrating the operation of the circuit in FIG. 2.

The operation of the circuit in FIG. 2 is as follows. When the voltage level of inversion input 28 is higher in comparison with the voltage level of the non-inversion input 29 voltage comparison circuit 27 generates a "low" output level signal and conducts transistor 33 so that capacitor 30 will be charged by the current flowing through transistor 33. Needless to say, capacitor 30 will also be charged by the current generated by buffer circuit 23. When the voltage level of inversion input 28 is lower transistor 33 will become non-conductive and the charging of capacitor 30 by transistor 33 is cut off. While transistor 33 is non-conductive, the charge in capacitor 30 is discharged via output 26 of buffer circuit 23 due to the fact that the voltage level at input 24 is lower than that at output 34. The circuit constants may be selected such that the time constant as the product of the capacitance of capacitor 30 and the output resistance of buffer circuit 23 is more than several times as much as the period of the aforesaid AC component. The circuit formed by voltage comparison circuit 27 and transistor 33, etc., functions as a measure to render the time constant for the charging of capacitor 30 to be less than the aforesaid time constant. By rendering the charging time of capacitor 30 to be greater than the discharge time of the same, the voltage appearing across capacitor 30 will have the characteristics such as represented by a waveform which, as shown by the output line in FIG. 3, is obtained by connecting the points proximate to the tops of the AC input waveform. The voltage across capacitor 30 is utilized for controlling the diaphragm as a smoothed output.

When the circuit of FIG. 2 is used for smoothing circuit 17 in FIG. 1, the output excluding capacitor 30 in FIG. 2 is connected to storage switch 19, and storage capacitor 18 may be concurrently used as the smoothing capacitor.

In the above description, explanation has been made about the structure and operation of the circuit for controlling the diaphragm using auxiliary light including the AC component, but the circuit of FIG. 1 may also be used as a diaphragm control circuit of the shutter speed priority type. In this case, the input of smoothing circuit 17 may be switched to a circuit (not shown) that generates a voltage signal corresponding to a manually set shutter speed. When the circuit is used for the shutter speed priority mode exposure control with an object illuminated by natural light without the AC component, then the output voltage of smoothing circuit 17 must be kept equal to the input voltage, or the difference between the output and input voltages must be kept constant. Now, providing that the offset voltage between the two input terminals of voltage comparison circuit 27 is zero volts, voltage comparison circuit 27 becomes unstable due to noise, etc. and the signal at output 34 will fluctuate unexpectedly when the voltage levels at input 24 and output 34 are equal to each other. In order to prevent such fluctuation, an offset of about 10 mV is provided between the inputs of voltage comparison circuit 27. With this offset voltage, when the voltage levels at input 24 and output 34 are equal to each other, voltage comparison circuit 27 will generate a "high" voltage, so that transistor 33 becomes non-conductive to avoid unexpected charging of capacitor 30. In place of such an offset, a circuit for making transistor 33 forcefully non-conductive may be used for the shutter speed priority mode.

Also, the circuit may be modified such that the level shift by potentiometers 10 and 11 may be executed prior to, or after, storage capacitor 18 in so far as the comparison circuit is inverted when a relationship corresponding to a given step difference of diaphragm aperture occurs between the signals corresponding to a light measurement with the diaphragm aperture fully open and to a light measurement with the diaphragm aperture being stopped-down.

It is, therefore, desired that the present invention not be limited to the embodiments specifically described, but that it include all such modifications and variations that would be obvious to those skilled in this art. The scope of our invention should be determined by the equivalents of the various terms as recited in the following annexed claims.

What is claimed is:

1. A camera exposure control circuit, comprising:
    a photoelectric circuit including a photoelectric element to receive light from an object to be photographed through the camera diaphragm aperture for generating a voltage output as a function of a brightness of an object to be photographed;
    a control circuit for controlling the camera exposure in accordance with said voltage output including a comparison circuit for comparing said voltage output, at the time when the diaphragm aperture is being stopped-down, with a given voltage level, and providing an inverted output when said voltage output attains a specified relationship with said given voltage level, and further including means for stopping the stopping-down operation of the diaphragm in response to said inverted output; and
    a smoothing circuit connected between said photoelectric circuit and said control circuit and having a smaller charging time constant than the discharging time constant thereof.

2. An exposure control device as claimed in claim 1 wherein said photoelectric circuit includes a first terminal that generates a voltage corresponding to the brightness of an object being measured and a second terminal that generates a voltage shifted from the voltage of said first terminal by an amount of voltage corresponding to the step difference between a predetermined diaphragm aperture value and the full open diaphragm aperture value, and said control circuit further includes a storage circuit for storing the voltage from said second terminal prior to stopping-down operation of the diaphragm, and said comparison circuit has a first input terminal that receives the voltage from said first terminal of the photoelectric circuit and a second input terminal that receives the output from said storage circuit.

3. An exposure control circuit as claimed in claim 2 wherein said smoothing circuit includes a first smoothing circuit connected between said first terminal of said photoelectric circuit and said first input terminal of said comparison circuit, and a second smoothing circuit connected between said second terminal of said photoelectric switching circuit and said storage circuit.

4. An exposure control circuit as claimed in claim 3 wherein each of said first and second smoothing circuits includes a voltage smoothing capacitor, an input terminal, a buffer circuit interposed between said input terminal and said smoothing capacitor, a first charge-discharge line to each smoothing circuit from said input terminal, a switch element that forms a second charge-discharge line different from said first charge-discharge line, and a comparison means which compares the electric potential of the input terminal of said first or second smoothing circuit and the electric potential of the smoothing capacitor and causes the aforementioned switch element to conduct when the former potential is higher than the latter.

5. An exposure control circuit as claimed in claim 4 wherein the smoothing capacitor of said second smoothing circuit also functions as the storage capacitor for said storage circuit.

* * * * *